Patented Jan. 8, 1935

1,987,321

UNITED STATES PATENT OFFICE 1,987,321

PRESERVATION OF OILS, FATS, FATTY OILS, FATTY ESTERS, FATTY ACIDS, FATTY ACID SALTS, AND RELATED COMPOUNDS

William S. Calcott and William A. Douglass, Pennsgrove, N. J., and Herbert W. Walker, Wilmington, Del., assignors to E. I. du Pont de Nemours & Company, Wilmington, Del., a corporation of Delaware No Drawing. Application December 18, 1929, Serial No. 415,016

27 Claims. (Cl. 87—9)

This invention relates to the treatment of auto-oxidizable substances such as oils, fats, fatty oils, fatty esters, fatty acids and salts of fatty acids to retard deterioration and development of rancidification. More particularly it pertains to the addition of organic compounds to such substances in order to accomplish these results. Specifically, the incorporation of diaryl or diaralkyl compounds, such as oxy-diaryl amines into the material to be preserved is contemplated.

Butter, lard, cocoanut oil and other animal and vegetable fats and fatty oils, together with soap, the sodium or potassium salts of the fatty acids contained in these fats and fatty oils, tend to develop an objectionable rancid odor and taste on exposure to air under ordinary conditions. This deterioration is due to the oxidation of the fatty acid part of the fat or soap molecule by atmospheric oxygen. The oxide derivatives which are first formed become decomposed or altered and produce substances having a rancid odor and taste.

Some work has been done in the fat preservation field as shown by U. S. P. 1,542,438 to Divine, wherein aniline, alpha naphthylamine, para phenylene-diamine, diphenylamine and hexa-methylenetetramine are added to soap. In U. S. P. 1,575,529 to Bollman soya bean lecithin is added to edible oils. Other improvements in the keeping quality of auto-oxidizable substances are claimed in U. S. P. 1,672,657 to Powell according to which the condensation product of an aromatic amine and an aliphatic aldehyde is added to the material to be preserved. The foreign patent art also discloses work along this line as evidenced by B. P. 181,365 to Moureu and Du Fraisse who employ the phenols such as pyrogallol, guaiacol, and hydroquinone as stabilizers for auto-oxidizable substances. In B. P. 208,189 to Lever Bros. the phenols of the types hydroquinone, guaiacol and resorcinol are used to prevent deterioration of whale oil. Rechburg, Braum and Oetermann in D. R. P. 254,303 disclose sulfur and pyrogallol for the preservation of oils and fats. Boehringer in D. R. P. 308,408 discloses alkali lactates as suitable stabilizers for margarine, butter and lard. Many of the compounds heretofore employed, however, have been open to the objection that they either discolor the product to be preserved or form compounds that have this objectionable property. Certain compounds of the prior art impart to the product in which they are incorporated a distinctive odor. Other proposed preventives are actually ineffectual or are effective only for a short time.

This invention has as an object the preservation of fats, fatty oils, fatty esters, fatty acids, fatty acid salts and the like. A further object of this invention is to insure the retention of the original odors of these materials for indefinite periods. Still further objects are to prevent or retard the auto-oxidation of materials of this nature, to keep the materials sweet (in the sense of the odors given off) for a long period, to maintain the original chemical and physical states for extended periods, to prevent reaction of these substances or their constituent parts with the atmosphere or its constituent parts such as oxygen, to prevent oxygen absorption by the materials to be preserved and generally overcome the objectionable features of the prior art. Other objects will appear hereinafter.

These objects are accomplished by the invention herein disclosed which is related to the invention of application No. 391,706, filed September 10, 1929, by the same inventors in that it involves further work in the same field. In that application the preservation of oils, fats, etc. by the addition thereto of diaryl compounds is disclosed and in the examples set forth the aryl groups are directly connected. It has now been found that preservation may also be accomplished by compounds containing a plurality of aryl groups connected through or to an intermediary, for example, an amino radical. In compounds of this class, those having a hydroxy, alkoxy or amino radical attached to an aryl group are particularly effective.

According to this invention members of the oxy-diaryl-amine class of organic compounds are incorporated into the substances to be preserved. When so incorporated they act as antioxidants to prevent combination with or absorption of oxygen thereby delaying or preventing deterioration and ultimate rancidity. The general formula of the compounds used is

$$XO-R-NH-R'-Y$$

where R and R' are aryl or aralkyl which are alike or different, X is hydrogen or alkyl, and Y is hydroxy, alkoxy or hydrogen. The retarding agents may be incorporated in the oil or fat in any suitable manner as, for example, by mixing, and at any time found preferable as, for instance, before or during preparation or in the natural or ordinary state. By way of illustrating the invention the following examples are given.

Example I

When 0.1% p-hydroxy diphenylamine was introduced into commercial lard and oxidation measurements made at 60° C. in an oxygen atmosphere of 80% relative humidity on treated and untreated samples it was found that the sample containing p-hydroxy diphenylamine required 35 hours to absorb 2% by weight of oxygen, whereas the untreated control sample absorbed this amount of oxygen in 9 hours. Oxidation is retarded and likewise the deterioration and development of rancidity accompanying normal oxidation.

Example II

White olive castile soap containing 0.1% p-ethoxy phenyl-a-naphthylamine was protected against atmospheric oxidation and attendant rancidification for a considerably increased period of time. Untreated soap at 60° C. in an oxygen atmosphere of 80% relative humidity absorbed 2.5% by weight of oxygen in 32 hours, whereas in the presence of p-ethoxy phenyl-a-naphthylamine more than 160 hours were required for 2.5% oxygen to be absorbed. The treated sample possessed a sweet, non-rancid odor at the end of this time while the untreated control was strongly rancid.

Example III

If 0.2% p-hydroxy diphenylamine be incorporated in cocoanut oil and the vegetable oil be exposed to the action of atmospheric oxygen at 60° C. in such a way as to measure the rate and extent of oxygen absorption manometrically it is found that the treated soap absorbs oxygen at a much slower rate than an untreated control oil sample. An inhibition of oxidation is secured by the use of p-hydroxy diphenylamine resulting in an improvement in the aging qualities of the oil which otherwise would have become deteriorated and rancid.

It will be understood that the concentrations of antioxidant agents may vary to secure protection against deterioration to a less and greater degree depending on the nature of the fat, fatty oil or soap in question, the nature of the antioxidant, and the actual concentration of agent used. Ordinarily the amount of the preservative used ranges from 0.001 to 1.% but this invention contemplates greater amounts if there be a particular need therefor, although so far it has not been found necessary to use more than the maximum amount stated above. The preservatives listed are not harmful so far as applicants are aware, but it is probably advisable to limit their use in edible materials to small quantities. Accordingly the particular conditions of each case will determine the amount needed.

In the examples of antioxidants listed further on in this specification certain aryl groups in this class of compounds are disclosed, for instance, phenyl, naphthyl and biphenyl. It is to be understood that these are given as illustrative and not as limiting. Use of any other aryl groups such as tolyl, and xylyl may be made with effectiveness. It will, of course, be obvious that when the aryl groups have substituents other than oxy groups that the same must be of such nature as not to neutralize the oxy radical or nullify the inhibitive effect of the main nucleus, and furthermore must be compatible with the object in view.

As examples of the class of compounds described above which may be used effectively the following are given:— p-hydroxy diphenylamine,

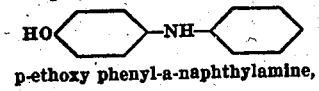

p-ethoxy phenyl-a-naphthylamine,

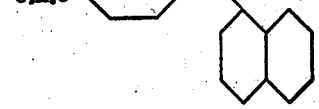

p-hydroxy phenyl-beta-naphthylamine,

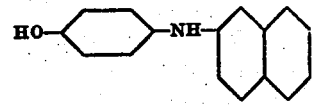

pp'-diethoxy diphenylamine,

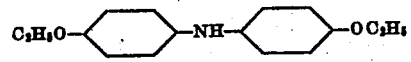

pp'-dihydroxy diphenylamine,

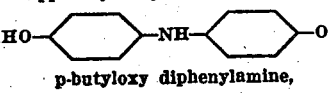

p-butyloxy diphenylamine,

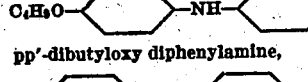

pp'-dibutyloxy diphenylamine,

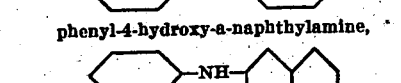

phenyl-4-hydroxy-a-naphthylamine,

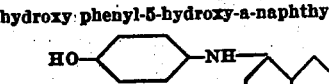

p-hydroxy phenyl-5-hydroxy-a-naphthylamine,

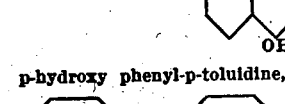

p-hydroxy phenyl-p-toluidine,

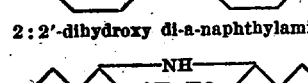

2:2'-dihydroxy di-a-naphthylamine,

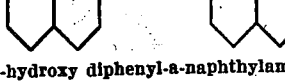

p-hydroxy diphenyl-a-naphthylamine,

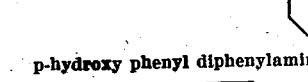

p-hydroxy phenyl diphenylamine,

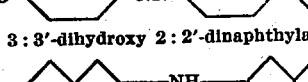

3:3'-dihydroxy 2:2'-dinaphthylamine,

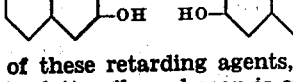

By use of these retarding agents, auto-oxidation of fats, fatty oils and soap is effectively retarded, delayed or prevented in such a way that they remain sweet and apparently unchanged for long periods of time.

Of the oxy-diaryl-amines the alkoxy-diphenyl amines are preferred. Especially good results have been obtained with p:p'-diethoxy-diphenyl-amine.

In this specification and claims the term "oxy-" is used generically and includes "hydroxy" and "alkoxy-".

By the term "auto-oxidizable" is meant the capacity for spontaneous chemical combination with or absorption of oxygen of the atmosphere under ordinary conditions.

As many apparently widely different embodiments of this invention may be made without departing from the spirit and scope thereof, it is to be understood that we do not limit ourselves to the specific embodiments thereof except as defined in the appended claims.

We claim:

1. A member of the group fats, fatty oils, fatty esters, fatty acids and fatty acid salts together with 0.001 to 0.2% para: para'-diethoxy-diphenylamine as an oxidation inhibitor and rancidification preventative.

2. A composition of matter containing a member of the group oils, fats, fatty oils, fatty esters, fatty acids, fatty acid salts, and the like tending to develop rancidity together with an oxidation inhibitor and rancidification retarder comprising a compound having a plurality of aryl groups joined to an amino nucleus and at least one of said aryl groups being substituted.

3. A composition of matter containing a member of the group fats, fatty oils, fatty esters, fatty acids, fatty acid salts and the like together with an oxidation inhibitor and rancidification retarder comprising a compound having a plurality of aryl groups joined to an amino nucleus and at least one of said aryl groups having an oxy substituent.

4. A composition of matter containing a member of the group fats, fatty oils, fatty esters, fatty acids, fatty acid salts and the like together with an oxidation inhibitor and rancidification retarder comprising a compound having a plurality of aryl groups joined to an amino nucleus and at least one of said aryl groups having an ethoxy substituent.

5. A composition of matter containing a member of the group fats, fatty oils, fatty esters, fatty acids, fatty acid salts and the like together with an oxidation inhibitor and rancidification retarder comprising a compound having a plurality of aryl groups joined to an amino nucleus at least one of said aryl groups being a phenyl group and at least one of said aryl groups having a substituent other than a nitro or sulfonic group.

6. A composition of matter containing a member of the group fats, fatty oils, fatty esters, fatty acids, fatty acid salts and the like together with an oxidation inhibitor and rancidification retarder comprising a compound having a plurality of aryl groups joined to an amino nucleus at least one of said aryl groups being a phenyl group, and at least one of said aryl groups having an oxy substituent.

7. A composition of matter containing a member of the group fats, fatty oils, fatty esters, fatty acids, fatty acid salts and the like together with an oxidation inhibitor and rancidification retarder comprising a compound having a plurality of aryl groups joined to an amino nucleus at least one of said aryl groups being a phenyl group, and at least one of said aryl groups having an ethoxy substituent.

8. A composition of matter containing a member of the group fats, fatty oils, fatty esters, fatty acids, fatty acid salts and the like together with an oxidation inhibitor and rancidification retarder comprising a compound having a plurality of aryl groups joined to an amino nucleus at least two of said aryl groups being phenyl groups and at least one of said aryl groups being ethoxy substituted.

9. A composition of matter containing a member of the group fats, fatty oils, fatty esters, fatty acids, and fatty acid salts and as an oxidation inhibitor and rancidification preventative a compound of the class

where R and R' are aryl or aralkyl groups which may be alike or different, X is hydrogen or alkyl and Y is hydrogen, hydroxy or alkoxy.

10. A composition of matter containing a compound capable of rancidification and as an oxidation inhibitor and rancidification preventative a compound of the alkoxy-diarylamine class.

11. A composition of matter containing a member of the group fats, fatty oils, fatty esters, fatty acids, and fatty acid salts and as an oxidation inhibitor and rancidification preventative a compound of the alkoxy-diarylamine class.

12. A composition of matter containing a member of the group fats, fatty oils, fatty esters, fatty acids, and fatty acid salts and as an oxidation inhibitor and rancidification preventative a compound of the ethoxy-diphenylamine class.

13. Animal fat together with an alkoxy-diaryl-amine as an inhibitor of rancidification.

14. Lard together with an alkoxy-diaryl-amine as an inhibitor of rancidification.

15. Vegetable fat together with an alkoxy-diaryl-amine as an inhibitor of rancidification.

16. Cocoanut oil together with an alkoxy-diaryl-amine as an inhibitor of rancidification.

17. Soap together with an alkoxy-diaryl-amine as an inhibitor of rancidification.

18. The composition of claim 17 in which the alkoxy-diaryl-amine is an ethoxy-diaryl-amine.

19. The composition of claim 17 in which the alkoxy-diaryl-amine is an ethoxy-diphenyl-amine.

20. A composition of matter probably comprising a member of the group consisting of fats, fatty oils, fatty esters, fatty acids and fatty acid salts and an alkoxy diaryl-amine which is substantially identical with the product resulting from incorporating an alkoxy diaryl-amine in a member of the aforesaid group.

21. A composition of matter composed of a fatty oil subject to the development of rancidity together with a rancidification retarder of the class consisting of p-hydroxy diphenylamine, pp'-dihydroxy diphenylamine, and p-butoxy diphenylamine.

22. A composition of matter composed of a fatty oil subject to the development of rancidity together with p-butoxy diphenylamine as a rancidification retarder.

23. A composition of matter composed of a fatty oil subject to the development of rancidity together with p-hydroxy-diphenylamine as a rancidification retarder.

24. A composition of matter composed of a fatty oil subject to the development of rancidity together with p:p'-di-hydroxy-diphenylamine as a rancidification retarder.

25. A composition of matter composed of a fatty oil subject to the development of rancidity together with an oxy-di-aryl-amine from the group consisting of hydroxy- and alkoxy-di-aryl-amines as a preservative.

26. A composition of matter composed of a fatty oil subject to the development of rancidity together with an oxy-di-phenyl-amine from the group consisting of hydroxy- and alkoxy-diphenyl-amines as a preservative.

27. A composition of matter composed of a fatty oil subject to the development of rancidity together with an oxy-phenyl-naphthyl-amine from the group consisting of hydroxy- and alkoxy-phenyl-naphthyl-amines as a preservative.

WILLIAM S. CALCOTT.
WILLIAM A. DOUGLASS.
HERBERT W. WALKER.

Certificate of Correction

Patent No. 1,987,321.   January 8, 1935.

WILLIAM S. CALCOTT ET AL.

It is hereby certified that error appears in the printed specification of the above numbered patent requiring correction as follows: Page 2, second column, lines 35 to 40, strike out the formula and insert instead—

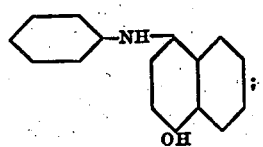

and that the said Letters Patent should be read with this correction therein that the same may conform to the record of the case in the Patent Office.

Signed and sealed this 19th day of March, A. D. 1935.

[SEAL]

LESLIE FRAZER,
Acting Commissioner of Patents.

Certificate of Correction

Patent No. 1,987,321. January 8, 1935.

WILLIAM S. CALCOTT ET AL.

It is hereby certified that error appears in the printed specification of the above numbered patent requiring correction as follows: Page 2, second column, lines 35 to 40, strike out the formula and insert instead—

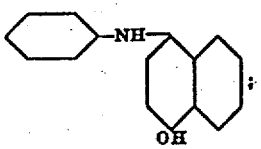

and that the said Letters Patent should be read with this correction therein that the same may conform to the record of the case in the Patent Office.

Signed and sealed this 19th day of March, A. D. 1935.

[SEAL]

LESLIE FRAZER,
*Acting Commissioner of Patents.*